United States Patent [19]

Childs et al.

[11] Patent Number: 5,446,632
[45] Date of Patent: Aug. 29, 1995

[54] VEHICLE HEADLAMP ASSEMBLY WITH CALIBRATION RESTRICTOR

[75] Inventors: Mark A. Childs; Jan A. Wisler; Marcus M. Hess, all of Anderson, Ind.

[73] Assignee: General Motors Corporation, Detroit, Mich.

[21] Appl. No.: 283,360

[22] Filed: Aug. 1, 1994

[51] Int. Cl.$^6$ ............................................. B60Q 1/08
[52] U.S. Cl. .......................................... 362/69; 362/66
[58] Field of Search .................................. 362/66, 69

[56] References Cited

U.S. PATENT DOCUMENTS

| | | | |
|---|---|---|---|
| 3,689,725 | 8/1987 | Saijo et al. | 362/66 |
| 5,023,759 | 6/1991 | Eckenrode | 362/66 |
| 5,063,480 | 11/1991 | McMahan et al. | 362/61 |
| 5,067,056 | 11/1991 | Suzuki et al. | 362/66 |
| 5,068,769 | 11/1991 | Umeda et al. | 362/61 |
| 5,077,642 | 12/1991 | Lisak | 362/66 |
| 5,091,829 | 2/1992 | Hendrischk et al. | 362/61 |
| 5,138,533 | 8/1992 | Daumueller | 362/66 |
| 5,138,542 | 8/1992 | Daumueller et al. | 362/420 |
| 5,140,503 | 8/1992 | Lisak | 362/61 |
| 5,150,958 | 9/1992 | Miyazawa et al. | 362/66 |
| 5,186,531 | 2/1993 | Ryder et al. | 362/66 |
| 5,186,532 | 2/1993 | Ryder et al. | 362/66 |
| 5,193,905 | 3/1993 | Edwards et al. | 362/425 |
| 5,197,799 | 3/1993 | Dehaene | 362/420 |

Primary Examiner—Carroll B. Dority
Attorney, Agent, or Firm—Ernest E. Helms

[57] ABSTRACT

A vehicle headlamp assembly is provided, having an adjustment device for adjusting the position of a lamp unit and wherein in a preferred embodiment the adjustment device is combined with a rotatable recalibration arrangement that includes a position indicator: in the form of a disk member provided with teeth at its periphery and in which the teeth of the disk member are shielded by a wall so as to prevent accidental movement of the disk member when the latter is positioned to indicate the aimed position of the lamp unit in the horizontal plane. Additionally, there is a calibration restrictor that holds the position indicator in the zero ("0") position during initial adjustment of the lamp unit during vehicle assembly.

5 Claims, 5 Drawing Sheets

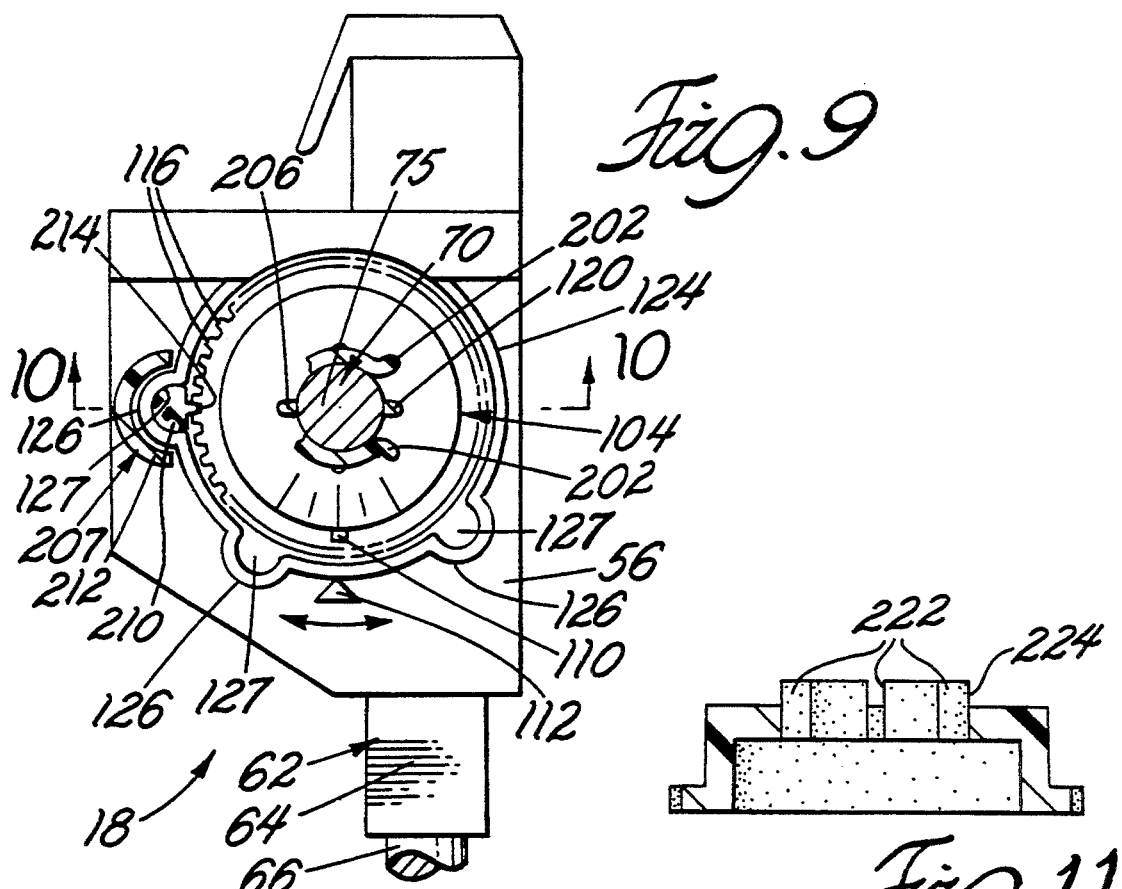
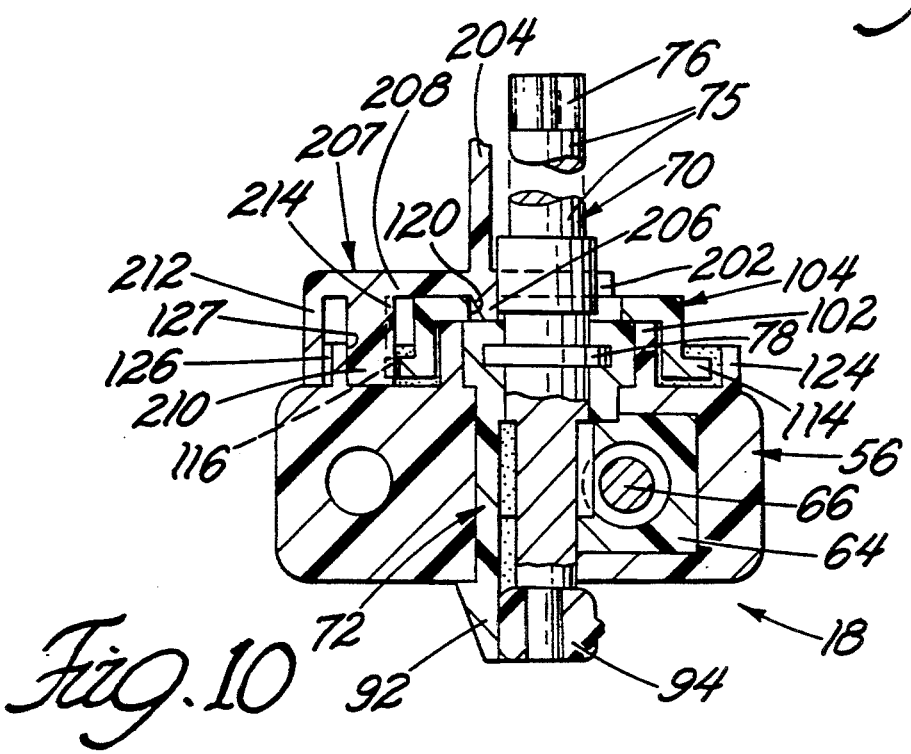

VEHICLE HEADLAMP ASSEMBLY WITH CALIBRATION RESTRICTOR

This invention concerns headlamps in general and, more particularly, relates to a vehicle headlamp having an adjustment device for providing fore and aft adjustable movement of one end of the headlamp and that includes indicia and a pointer indicator which can be repositioned relative to the indicia to indicate the correct aimed position of the headlamp and afterwards can be recalibrated if the need should arise and additionally having a calibration restrictor for initial adjustment.

BACKGROUND OF THE INVENTION

Vehicle headlamps are currently designed so as to permit on-board headlamp aiming by providing level devices on the headlamp that provide a visual indication when the headlamp is properly aimed. In addition, current government regulations require some form of indicator to be provided on the headlamp that will permit one to observe readily when the headlamp is out of aim in the horizontal plane and allow the headlamp to be manually repositioned to the correct aimed position. To this end, various types of headlamp adjustment devices incorporating recalibration features have heretofore been proposed for allowing a person to re-aim the headlamp if the latter should move out of the aimed position due to vibrations or other causes. One example of a headlamp having a headlamp adjustment device with a recalibration arrangement can be seen in U.S. Pat. No. 5,351,170, to Nagengast et al. In Nagengast et al, when the headlamp assembly is finally assembled at the assembly plant, the position indicator must be moved to the zero position. By the position indicator being moved to the zero position, a mechanic in the future will be able to adjust the headlamp assembly back to its zero position after maintenance. However, to ensure that the indicator is in the zero position either requires an operator to hold the indicator while the adjuster is going through its final adjustment or for an operator to move the indicator dial after the final adjustment has been completed, since the indicator disk is typically frictionally connected to the driver member of the adjuster.

SUMMARY OF THE INVENTION

The present invention provides an improved adjuster which can be initially adjusted to the zero position, and the position indicator is restricted to the zero position during such operation. Thereafter, in an environmentally friendly manner, the restrictor may be removed from the adjuster device and shipped back to the lamp unit manufacturing facility to be reused.

Other objects and advantages of the present invention will be more apparent from the following detailed description when taken with the drawings in which:

BRIEF DESCRIPTION OF THE DRAWINGS

FIG. 9 is a view taken along line 9—9 of FIG. 8;

FIG. 10 is a view taken along line 10—10 of FIG. 9; and

FIG. 11 is a sectional view of an alternate preferred embodiment indicator disk which has a slotted collar.

DETAILED DESCRIPTION OF THE INVENTION

Figure 1:
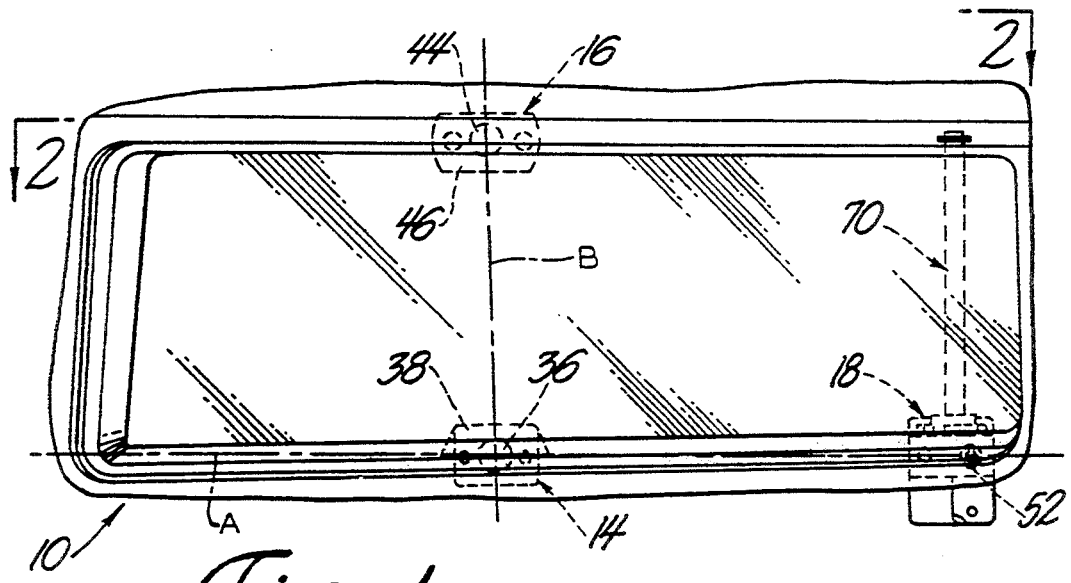
FIG. 1 is a front elevational view of a headlamp assembly combined with an adjustment device in accordance with Nagengast et al.
Figure 2:
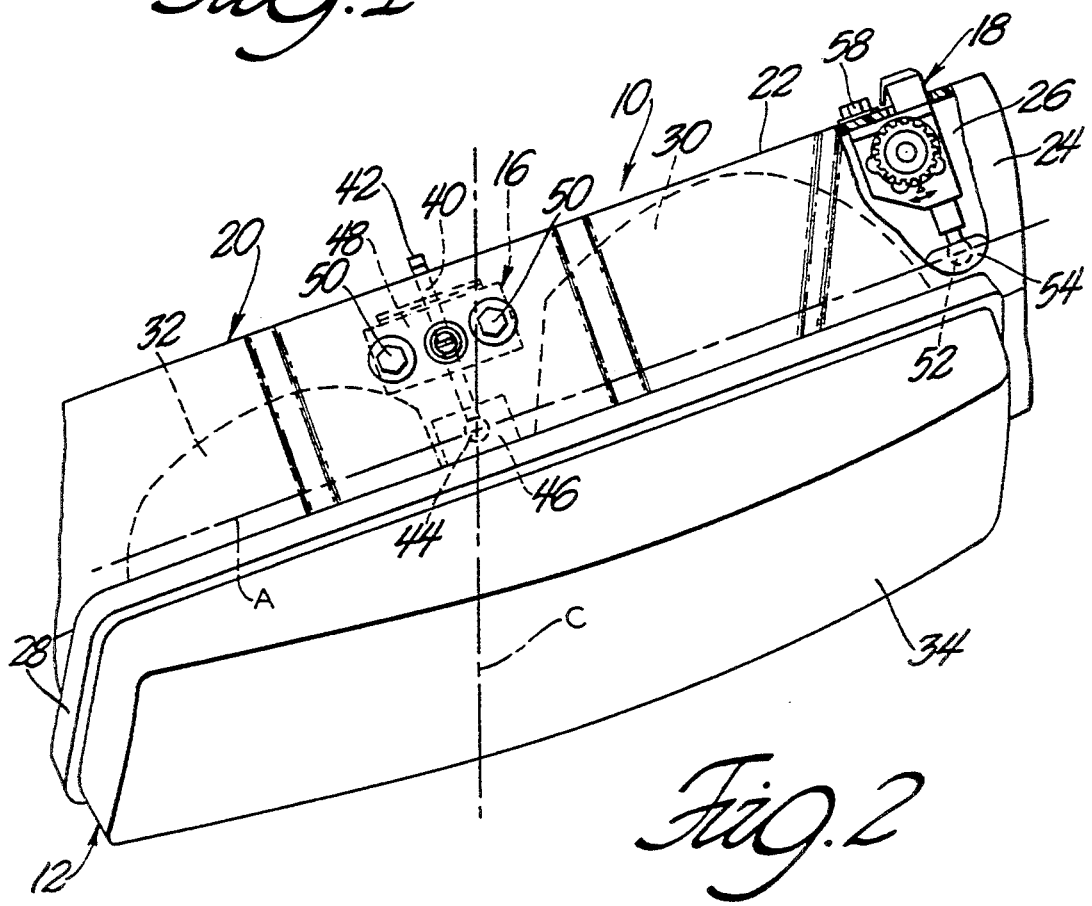
FIG. 2 is a plan view of the headlamp assembly taken on line 2—2 of FIG. 1.

Referring now to the drawings and more particularly to FIGS. 1 and 2 thereof, a headlamp assembly 10 for a motor vehicle is shown of the replaceable light bulb composite type. The headlamp assembly 10, according to the present invention, includes a lamp unit 12, a fixed ball pivot member 14 combined with an adjustment device 16 for lamp positioning about a horizontal aim axis "A" and an adjustment device 18 for lamp positioning about a vertical aim axis "B". The ball pivot member 14 and the adjustment devices 16 and 18 are mounted on a support panel 20 made of a plastic material and fastened to the sheet metal structure (not shown) fixed to the front end of the motor vehicle. By having the ball pivot member 14 and the adjustment devices 16 and 18 mounted on the support panel 20, the entire assembly can be shipped as a self-contained unit to a vehicle manufacturer and thereafter be mounted to a the sheet metal structure at the from end of a motor vehicle so as to permit selective adjustable movement of the lamp unit 12 for aiming purposes in a horizontal plane containing the horizontal aim axis "A" and in a vertical plane containing the vertical axis "B". In the alternative, the support panel 20 can be a structural part of the vehicle so that the ball pivot member 14 and the adjustment devices 16 and 18 combined with the lamp unit 12 are shipped as a unit to the vehicle manufacturing plant for installation on the vehicle.

As seen in FIG. 2, the support panel 20 includes a back wall 22 integral with a pair of vertically spaced, generally horizontal top and bottom walls 24 and 26, respectively, to which are fastened the ball pivot member 14 and the adjustment devices 16 and 18 which connect the lamp unit 12 to the support panel 20 and provide repositioning of the lamp unit 12 about the aforementioned horizontal aim axis "A" and the vertical aim axis "B".

The lamp unit 12 includes a plastic reflector member 28 formed with a pair of side-by-side parabolic cavities 30 and 32, the inner concave surface of each of which is aluminized so as to project a light beam forwardly and substantially parallel to an axis "C" seen in FIG. 2. The axis "C" is parallel to the longitudinal center axis of the associated vehicle (not shown) and the headlamp assembly 10 would be the right-hand unit when looking at the front end of the vehicle as seen in FIG. 1. It will be noted that the angled position of the lamp unit 12 is due to the rounded streamlined front end design currently popular with motor vehicles. Also,, although not shown, it will be understood that each of the parabolic cavities 30 and 32 is provided with a single filament replaceable bulb located so as to cause the associated parabolic concave; surface to project a light beam forwardly of the vehicle. The light bulb in the cavity 30 is provided with a filament located so as to allow the associated aluminized parabolic surface to project the so-called low beam when energized while the light bulb in the cavity 32 projects the so-called high beam when the filament thereof is energized. In addition, the reflector member 28 has its front end closed by a glass or plastic lens 34, the rear marginal portion of which is sealingly received by a channel (not shown) provided around the entire margin of the front portion of the reflector member 28. Thus, the lamp unit 12 is actually two separate headlamps, a low beam unit and a high beam unit, joined together so as to facilitate the aiming of the lamps through the adjustment devices 16 and 18.

As alluded to hereinbefore, the ball pivot member 14 and the adjustment devices 16 and 18 serve to support the lamp unit 12 and allow selective positioning thereof about the horizontal aim axis "A" and the vertical aim axis "B". It will be noted that the ball pivot member 14 takes the form of a ball stud, the rear end of which is fixed by a bracket or the like (not shown) to the back wall 22 of the support panel 20 and the front end of which is formed with a ball pivot 36 received within a ball socket 38 attached to the lower rear of the reflector member 28 in the manner illustrated in U.S. Pat. No. 4,959,758, issued on Sep. 25, 1990 to Filosa et al and assigned to the assignee of this invention. Thus, the ball pivot 36 provides a fixed pivot point at the intersection of the horizontal aim axis A and the vertical aim axis B about which the lamp unit 12 can be adjusted by the adjustment devices 16 and 18.

In this regard, the adjustment device 16 includes a threaded shaft 40, the rear end of which is formed with a drive head 42 and the front end of which is formed with a ball pivot 44. As in the case of the ball pivot member 14, the ball pivot 44 is received within a ball socket 46 which, in this instance, is attached to the upper end of the reflector member 28. The shaft 40 is threadably received within a housing 48 secured to the top wall of the support panel 20 by a pair of cap screws 50 so that rotation of the drive head 42 results in longitudinal movement of the lamp unit 12 about the horizontal aim axis "A" which passes through the center of the ball pivot 36 and the center of a ball pivot 52 which, as seen in FIG. 2, forms a part of the adjustment device 18 and is connected to the reflector member 28 by a ball socket 54.

The adjustment device 18 incorporated in the headlamp assembly 10 is intended to provide fore and aft movement of the outboard end of the lamp unit 12 resulting in adjustable positioning and aiming thereof about the vertical aim axis "B". In addition, the adjustment device 18 is provided with a recalibration arrangement which permits an observer to readily determine when the lamp unit 12 is out of proper aim and, by use of a hand tool, quickly return the lamp unit 12 to the aimed position.

More specifically, and as seen in FIGS. 3 through 6, the adjustment device 18 includes a plastic housing 56 which is fixed to the back wall 22 of the support panel 20 by one or more cap screws 58. The housing 56 is provided with a longitudinally extending bore 60 which is square in cross section and serves to accommodate a driver or slide member 62 which, as hereinafter will be explained, is movable relative to the housing 56. The slide member 62 consists of a block member 64 made of plastic which is also square in cross section and in which is secured an elongated metal shaft 66. The block member 64 is formed with a cut-out portion 68 which exposes a plurality of helical threads 69 formed on the shaft 66. The shaft 66 is nonrotatably secured within the block member 64 so that both the shaft 66 and the block member 64 are movable as a single unit longitudinally relative to the housing 56 when located in the opening 60.

Figure 4:
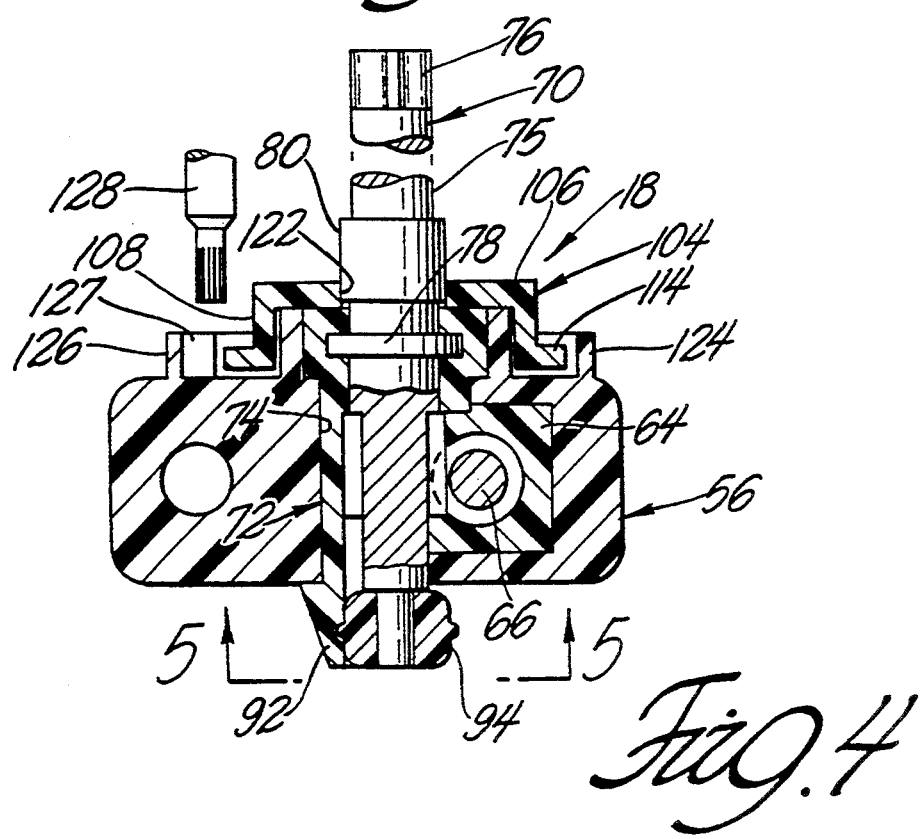
FIG. 4 is a sectional view taken on line 4—4 of FIG. 3.
Figure 6:
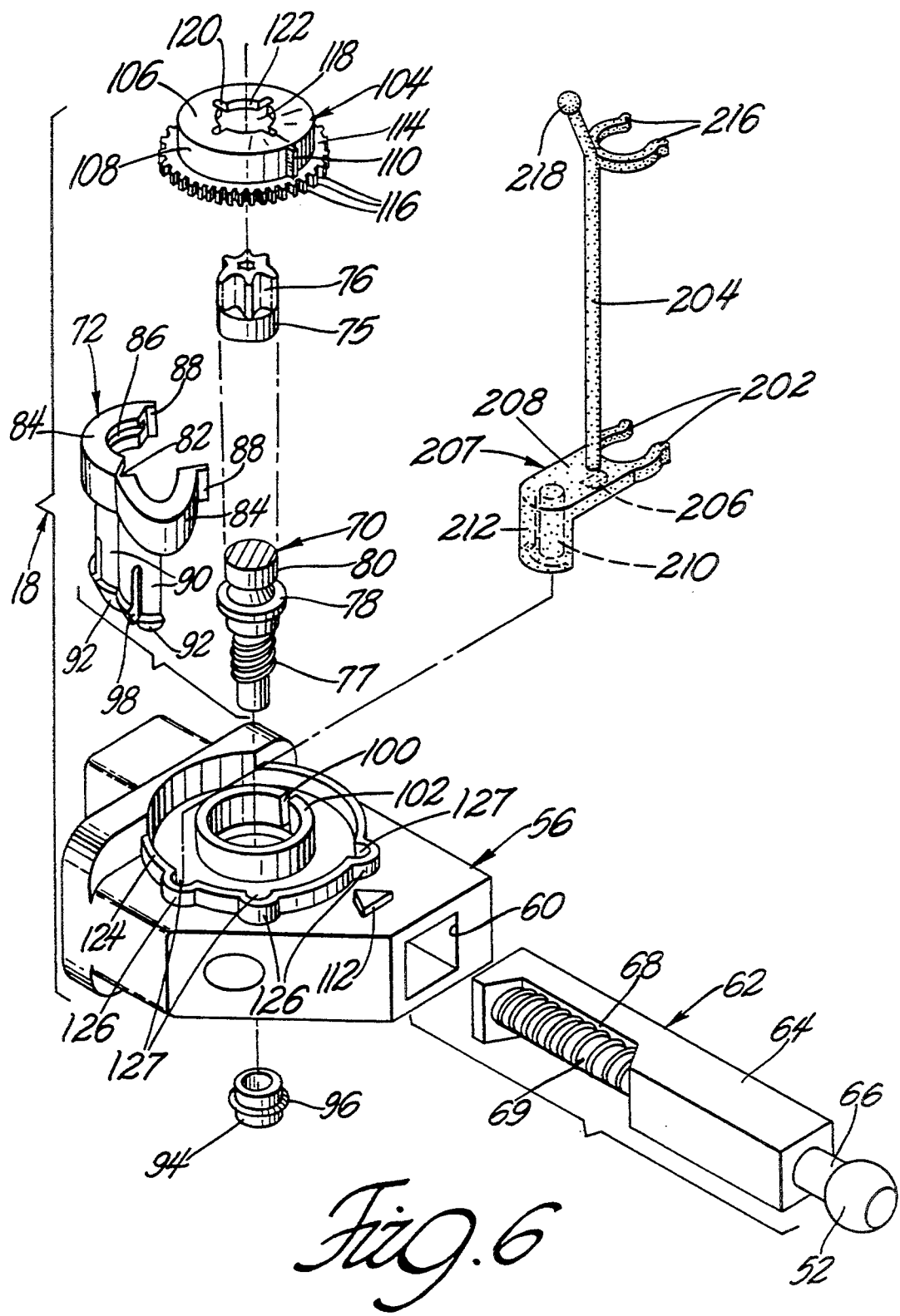
FIG. 6 is an exploded view showing the various parts of the adjustment device seen in FIGS. 1 through 5 with the added calibration restrictor of the present invention.
Figure 7:
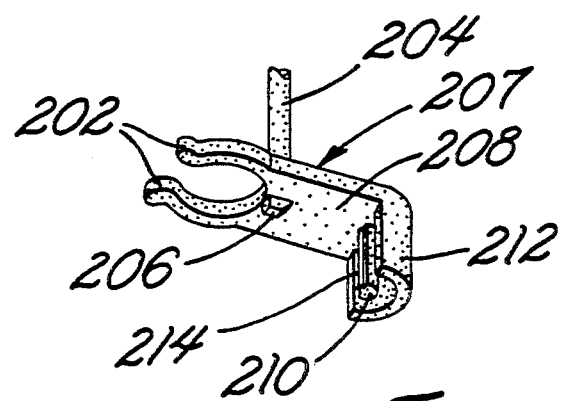
FIG. 7 is a bottom perspective view of the calibration restrictor.
Figure 8:
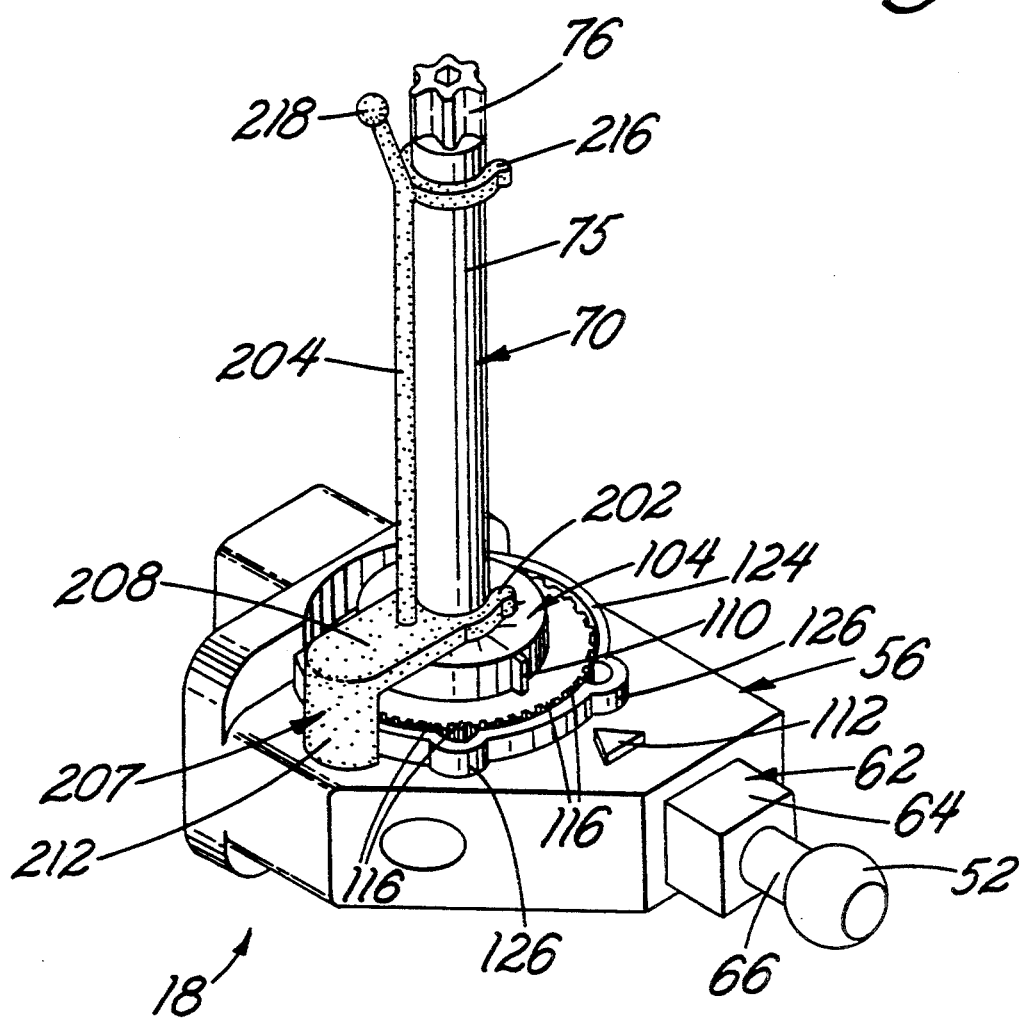
FIG. 8 is a perspective view of the adjuster of the present invention with the restrictor installed.

Movement of the slide member 62 relative to the housing 56 is realized through a drive member 70 rotatably mounted in a bushing 72 which, in turn, is located within a stepped vertically orientated bore 74 formed in the housing 56. As best seen in FIGS. 4 and 6, the driver member 70 takes the form of a shaft 75, the lower end of which is formed with helical threads which mesh with the threads of the shaft 66 mounted in the block member 64. The upper end of the shaft 75 is provided with a head 76 having teeth formed thereon. A radially outwardly extending flange 78 is formed on the shaft 75 just above the threads 77, and a cylindrical contact surface 80 is formed on the shaft 75 above the flange 78.

The bushing 72 is made of plastic and includes two parts connected by a living hinge 82. Each part of the bushing 72 is a mirror image of the other with the upper portion of each taking the form of a semi-circular section 84 provided with a semi-circular groove 86. In addition, each section 84 has the free end thereof provided with a tab 88 while the lower end of each section 84 is formed with a depending leg 90 terminating with a tapered lip 92.

During assembly of the bushing member 72 with the driver member, the two parts of the bushing member 72 are separated from each other as seen in FIG. 6, and the flange 78 of the driver member 70 is located within the groove 86 of one of the semi-circular sections 84 after which the other semi-circular section 84 is rotated about the living hinge 82 to enclose the driver member 70 and have the tabs of the two sections in contact with each other. At this point, the slide member 62 will be located in the bore 60 with the cut-out portion 68 facing the stepped bore 74, and the combined bushing 72 and driver member 70 are inserted into the stepped bore 74 and pushed therein until the tapered lip 92 snaps into the position seen in FIG. 4. A plastic cylindrical collar 94 is then press-fitted onto the lower end of the driver member 70 causing a radially outwardly extending ring 76 formed on the collar to snap into an annular groove in the legs 90 of the bushing 72 to lock the driver member 70 in the housing 56 with the threads 77 thereof in engagement with the threads 69 of the slide member 62. In this connection, it will be noted that each leg 90 of each part of the bushing 72 is a quarter section formed with a slit 98 so when the bushing 72 is wrapped around the driver member 70, a half section of the helical threads 77 on the driver member 70 is exposed for engagement with the threads 69 of the slide member 62. It will also be noted that the combined tabs 88 of the sections 84 serve as a locator which is received by a vertically oriented slot 100 formed in an upstanding ring-shaped boss 102 formed with the housing 56. Thus, when the tabs 88 are located in the slot 102, the exposed threads 77 of the driver member will properly engage the threads 64 of the slide member 62 so that rotation of the driver member 70 results in longitudinal movement of the slide member 62. The longitudinal movement of the slide member 62, in turn, causes fore or aft movement of the ball pivot 52, resulting in adjustable movement of the lamp unit 12 about the vertical axis "B" and in a horizontal plane. An adjustment device 18 of the type described above can be seen in U.S. Pat. No. 5,193,905, issued on Mar. 16, 1993 to Edwards et al.

Figures 3, 5:
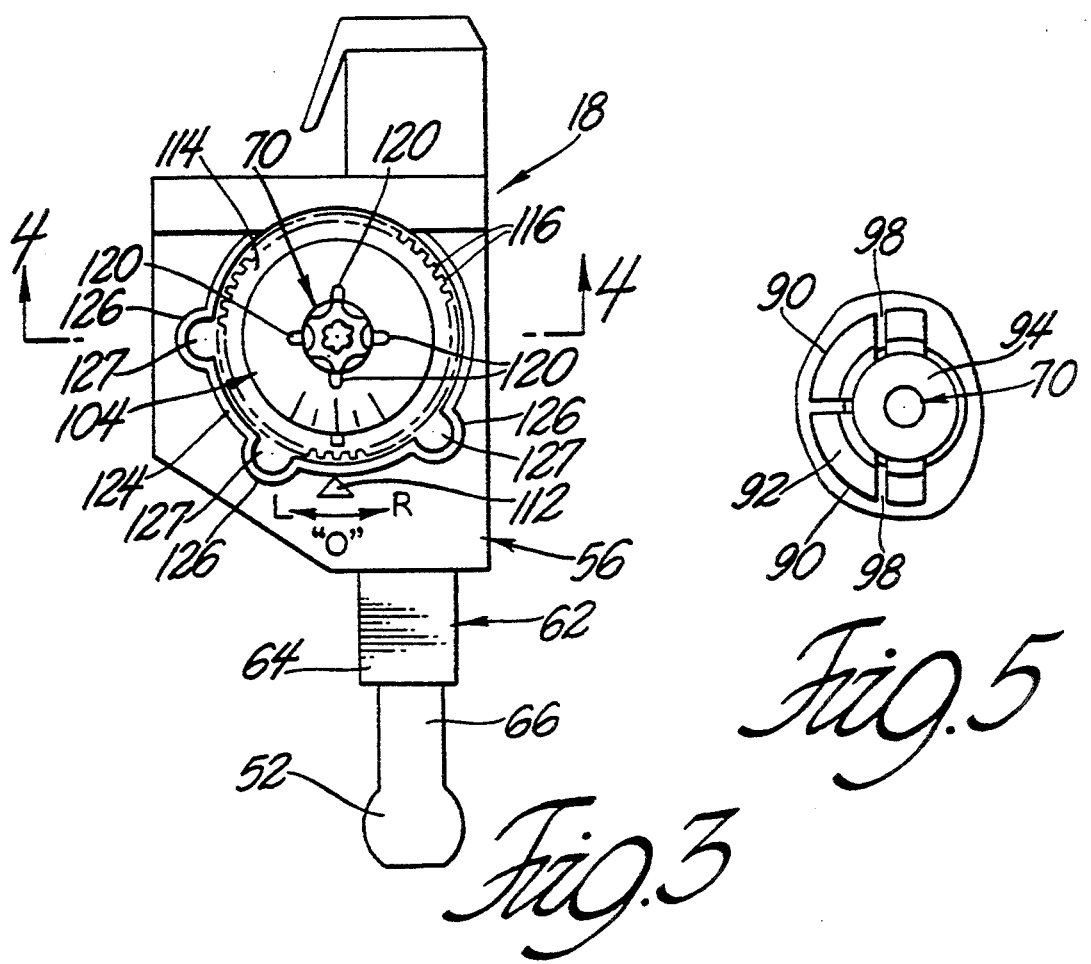
FIG. 3 is an enlarged plan view of the adjustment device incorporated with the headlamp assembly seen in FIGS. 1 and 2.
FIG. 5 is a partial view of the bottom end of the adjustment device taken on line 5—5 of FIG. 4.

The recalibration arrangement provided on the adjustment device 18 includes a plastic disk member 104 which, as seen in FIG. 4, is hat-shaped in cross section. As best seen in FIGS. 3, 4 and 6, the disk member 104 is formed with a planar top section 106 which is integral with a depending skirt section 108 having a vertically oriented pointer marking 110 formed thereon. As will be more fully explained hereinafter, when the pointer 110 is in line with a zero ("0") marking located on the housing 56 and taking the form of an arrow 112 as seen in FIG. 3, the lamp unit 12 will be in the correct aimed position in the horizontal plane. The skirt section 108 is integral with a radially outwardly extending circular flange 114 having a plurality of teeth 116 formed on the periphery thereof. A centrally located circular opening 118 is formed in the top section 106 of the disk member 104 that connects with four identical U-shaped slots 120 located along a pair of axes arranged orthogonally and intersecting at the center of the opening 118. The slots 120 define four circumferentially spaced arcuate contact surfaces 122 lying on a common circle which frictionally engage the cylindrical contact surface 80 of the driver member 70.

The flange 114 of the disk member 104 is encircled by a circular upstanding wall 124 which is integral with the housing 56. The wall 124 serves as a shield to prevent the teeth 116 formed on the disk member 104 from being accidentally contacted and causing the disk member 104 from being inadvertently moved, causing the pointer 110 to move relative to the zero marking arrow 112 after the headlamp unit 12 has been aimed. The wall is also formed with three identical circumferentially spaced and radially outwardly extending bulges 126 each of which defines a semi-circular opening 127 for the work end 128 of a hand tool having multi-starred head teeth such as seen in FIG. 4. Thus, when the multi-starred teeth of the hand tool are inserted into one of the openings 127, the multi-starred teeth engage the teeth 116 of the flange 114 and, upon manual rotation of the hand tool, the disk member 104 can be rotated relative to the driver member 70.

It will be noted that the adjustment device 18 is designed so that the bushing 72 provides a predetermined frictional restraining force on the driver member 70 which is greater than the frictional restraining force existing between contact surfaces 80 and 122 of the disk member 104 and the driver member 70. In other words, the frictional force provided by the engaging contact surfaces 80 and 122 of the disk member 104 and the driver member 70 is such that when the driver member 70 is rotated using a hand tool, the disk member 104 will rotate with the driver member 70 as if the two were one unit. On the other hand, the frictional force applied by the bushing 72 is such that when the disk member 104 is rotated using the hand tool as explained above, the driver member 70 maintains its original position and does not rotate with the disk member 104.

As seen in FIG. 3, the pointer 110 is located in line with the zero marking arrow 112 on the housing 56 and, accordingly, indicates to the observer that the lamp unit 12 is in the properly aimed position in the horizontal plane. It is intended that this properly aimed position in the horizontal plane be achieved during final inspection of the vehicle in the vehicle manufacturer's assembly plant. In order to do so, the vehicle is driven onto a level platform, the lamp unit 12 is energized, and as is conventional, a mechanical aimer is used to obtain the initial aimed position of the lamp unit 12 in the horizontal plane by using a hand tool placed on the head 76 of the driver member 70 of the adjustment device 18 for causing fore or aft movement of the slide member 62. As the driver member 70 is rotated, the disk member 104 rotates with the driver member as explained above. Once the aimed position is obtained, a multi-starred head of a screwdriver is placed within one of the guide openings 127 of the wall 124 and the pointer 110 of the disk member 104 is aligned with the arrow 112 on the housing 56. After the vehicle is delivered to the customer, if the lamp unit 12 should for some reason move out of the aimed position in the horizontal plane due to vibrations or inadvertent rotation of the driver member 70, the pointer 110 will be displaced relative to the zero marking arrow 112. Once this is observed, it will be a simple matter to return the lamp unit 12 to the zero marking by applying the proper hand tool to the head 76 of the driver member 70 and causing the slide member 62 to move in the proper direction to allow the pointer 110 to once again be aligned with the zero marking arrow 112 on the housing 56.

Finally, it will be noted that the cut-out portion 68 of the block member 64 is designed so as to expose only enough threads 69 on the shaft 66 so that the driver member 70 can make slightly less than a full 360 degree revolution. In other words, the opposed ends of the cut-out portion serve as stops which limit the excursion of the slide member 62 relative to the housing 56 and also prevent a full 360 degree rotation of the driver member about its rotational axis. As should be apparent, if the driver member 70 were capable of rotating more than 360 degrees, it would not be possible to determine from observing the position of the pointer relative to the zero marking arrow (when the lamp is out of adjustment) whether the lamp unit 12 can be returned to the aimed position by merely rotating the driver member 70 directly to the zero marking or whether a complete 360 degree revolution is first necessary before the correct aimed position is achieved. In this instance, by assuring that the driver member 70 is limited to less than a 360 degree rotation, this problem is eliminated.

Referring additionally to FIGS. 7 through 10, the adjustment device 18 has a calibration restrictor 207 connected thereto. The calibration restrictor 207 has a main planar body 208 joined to a sliced cylindrical portion 212. Projecting downwardly from the main body is a bottom shaft 210 which has a singular tooth 214. Additionally, a downward projecting stud 206 is attached to the main body 208. A pair of clasping arms 202 project forwardly from the main body 208. The main body 208 also supports an upwardly extending shaft 204 which has near its extreme end a second pair of clasping arms 216 and a pull knob 218. The calibration restrictor typically will be plastic.

When shipped from the factory, the restrictor 207 will be connected to the housing 56 by insertion of the downward shaft 210 into one of the openings 127. This should only be done when the disk 104 is positioned to place the pointer 110 in alignment with the zero marking arrow 112. The downward positioning of the restrictor will be by a slight press fit. The cylindrical portion 212 of the restrictor will grasp the extending bulge 126 of the housing wall. Lower arms 202 will then be snapped about drive member 70 as well as the upper arms 216. The moth 214 of the lower shaft will engage itself with the teeth 116 of the disk member 104. Therefore, when the headlamp assembly 10 is then connected with the vehicle, an automatic aiming device (not shown) will bring a power wrench in connection with the head 76 of the shaft 75. The aiming of the headlamp assembly 10 will be effectuated by the rotation of the drive member 70. Because of the interlocking of the restrictor 207 with the disk member 104 and with the housing 56, the disk member 104 cannot move. Therefore, when the adjuster is finally set, the pointer 110 will still be aligned with the zero marking 112. At this point, the assembler can grasp the bulb 218 and simply remove the restrictor, placing it in a container for shipment to the lamp unit assembly to be recycled and used over and over again, as long as the restrictor 207 material will hold up.

Referring additionally to FIG. 11, this figure illustrates a modified disk which has an uprising collar portion 224 having radial slots 222. The radial slots 222 receive the downwardly extending stud 206. With this embodiment, the downward extending shaft 210 along with its associated tooth 214 may be eliminated if so desired.

Various changes and modifications can be made in the construction of this headlamp assembly without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a headlamp assembly having a lamp unit mounted on a fixed portion of a vehicle and supporting a light source, a first adjustment device and a second adjustment device located between the fixed portion of the vehicle and the lamp unit for adjusting the lamp unit in a vertical plane and in a horizontal plane, respectively, for aiming a light beam emitted by the light source, one of the adjustment devices comprising:

a housing generally secured to a fixed portion of the vehicle, the housing having a zero ("0") marking;

a driven member mounted by the housing and extendable therefrom to set a distance between the fixed portion of the vehicle and the lamp unit;

a driver member rotatably mounted to the housing wherein rotation of the driver member determines the extension of the driven member from the housing;

a position indicator mounted on the driver member for adjustable movement relative thereto and having a pointer marker therewith so that upon establishing the desired aim position of the lamp unit by rotating the driver member, the position indicator is located with the pointer marking in line with the zero ("0") marking; and a restrictor connected to the housing and the position indicator to prevent movement of the position indicator marking from the zero ("0") marking when the lamp unit is initially being adjusted.

2. An adjuster as described in claim 1 wherein the position indicator comprises a disk member having an outer periphery with a plurality of teeth and wherein the restrictor interlocks with the teeth.

3. An adjuster as described in claim 1 wherein the housing has a portion interlocking with the restrictor.

4. An adjuster as described in claim 2 wherein the restrictor interlocks with a portion of the housing.

5. An adjuster as described in claim 1 wherein the position indicator includes a disk member having a collar and the collar has a slot for interlocking with the restrictor.

* * * * *